United States Patent
Park et al.

(10) Patent No.: US 10,550,018 B2
(45) Date of Patent: Feb. 4, 2020

(54) MEDIA FILTER HAVING NONPOWERED MIXING AND COAGULATION BASIN, AND SEAWATER DESALINATION PLANT AND DISSOLVED AIR FLOATATION APPARATUS USING SAME

(71) Applicant: DOOSAN HEAVY INDUSTRIES & CONSTRUCTION CO., LTD., Changwon-si, Gyeongsangnam-do (KR)

(72) Inventors: Yong Hae Park, Busan (KR); Sung Won Park, Goyang-si (KR); Byung Sung Park, Incheon (KR); Sung Woo Woo, Seongnam-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 788 days.

(21) Appl. No.: 14/989,308

(22) Filed: Jan. 6, 2016

(65) Prior Publication Data
US 2016/0326029 A1 Nov. 10, 2016

(30) Foreign Application Priority Data

May 4, 2015 (KR) .................. 10-2015-0062718
May 8, 2015 (KR) .................. 10-2015-0064887

(51) Int. Cl.
*B01D 61/04* (2006.01)
*C02F 1/00* (2006.01)
(Continued)

(52) U.S. Cl.
CPC ............ *C02F 1/5209* (2013.01); *B01D 61/04* (2013.01); *C02F 1/5281* (2013.01); *C02F 9/00* (2013.01);
(Continued)

(58) Field of Classification Search
CPC ................ B01D 61/04; B01D 2311/04; B01D 2311/2649; C02F 1/004; C02F 1/24;
(Continued)

(56) References Cited

U.S. PATENT DOCUMENTS 2,275,954 A    3/1942 Gibson
3,235,234 A *  2/1966 Beaudoin .................. C02F 3/06
                                                   210/150
(Continued)

FOREIGN PATENT DOCUMENTS

EP    0965374 A1   12/1999
EP    2508483 A1   10/2012
(Continued)

OTHER PUBLICATIONS

Machine translation of JP 57-050513-A to Harada (1982) (obtained from JPO Nov. 2018) (Year: 1982).*

(Continued)

*Primary Examiner* — Lucas A Stelling
(74) *Attorney, Agent, or Firm* — Invenstone Patent, LLC

(57) ABSTRACT

A nonpowered mixing and coagulation basin is provided, which generates turbulences of at least two kinds inside the mixing and coagulation basin to which the raw water flows so that foreign matters contained in the raw water come into contact with each other while circulating by a water flow to be coagulated into a predetermined size, and a dissolved air floatation device using the same. The nonpowered mixing and coagulation basin has multiple stages with different packing materials and packing densities to form turbulent flows inside the raw water and control a flow speed, thereby uniformly mixing raw water and coagulant to enhance coagulation efficiency. The nonpowered mixing and coagulation basin simultaneously carries out mixing and coagulation at the front end part of the water treatment system, (Continued)

reduces equipment expenses by having no electric motor and agitator, and reduces power consumption because it does not use any power unit.

15 Claims, 6 Drawing Sheets

(51) Int. Cl.
*C02F 1/24* (2006.01)
*C02F 1/28* (2006.01)
*C02F 1/44* (2006.01)
*C02F 1/52* (2006.01)
*C02F 9/00* (2006.01)
C02F 103/08 (2006.01)

(52) U.S. Cl.
CPC .. *B01D 2311/04* (2013.01); *B01D 2311/2649* (2013.01); *C02F 1/004* (2013.01); *C02F 1/24* (2013.01); *C02F 1/283* (2013.01); *C02F 1/441* (2013.01); *C02F 1/52* (2013.01); *C02F 2103/08* (2013.01); *C02F 2301/024* (2013.01); *Y02A 20/131* (2018.01)

(58) Field of Classification Search
CPC .. C02F 1/283; C02F 1/441; C02F 1/52; C02F 1/5209; C02F 1/5281; C02F 9/00; C02F 2103/08; C02F 2301/024; Y02A 20/131; B01J 19/30
See application file for complete search history.

(56) References Cited

U.S. PATENT DOCUMENTS 3,545,619 A * 12/1970 Ettlich ...................... C02F 1/52
 210/196
2009/0211974 A1 8/2009 Bonnelye et al.

FOREIGN PATENT DOCUMENTS

| JP | 57050513 A | * | 3/1982 | ................ C02F 1/52 |
|---|---|---|---|---|
| JP | S57-50513 A | | 3/1982 | |
| JP | 05-038492 A | | 2/1993 | |
| KR | 20-2008-0001604 A | | 6/2008 | |
| KR | 10-0916709 B1 | | 9/2009 | |
| KR | 10-0988474 B1 | | 10/2010 | |
| KR | 10-2011-0068726 A | | 6/2011 | |
| KR | 10-1081771 B1 | | 11/2011 | |
| KR | 10-1133174 B1 | | 4/2012 | |
| KR | 10-2013-0012681 A | | 2/2013 | |
| KR | 10-2013-0025106 A | | 3/2013 | |
| KR | 10-2014-0046812 A | | 4/2014 | |
| KR | 10-1491001 B1 | | 2/2015 | |
| WO | 2011/139089 A2 | | 11/2011 | |

OTHER PUBLICATIONS

Official Translation of JP 57-050513 to Harada (1982) (obtained from USPTO Translation Branch Nov. 2018) (Year: 1982).*
Communication from the Korean Patent Office dated May 2, 2016 in counterpart application No. 10-2015-0064887.
Communication from the Korean Patent Office dated May 2, 2016 in counterpart application No. 10-2015-0062718.
An European Search Report dated Oct. 15, 2018 in connection with European Patent Application No. 16157758.0 which corresponds to the above-referenced U.S. application.

* cited by examiner

MEDIA FILTER HAVING NONPOWERED MIXING AND COAGULATION BASIN, AND SEAWATER DESALINATION PLANT AND DISSOLVED AIR FLOATATION APPARATUS USING SAME

CROSS-REFERENCE TO RELATED APPLICATIONS

This application claims priority to Korean Application Nos. 10-2015-0064887 filed on May 8, 2015 and 10-2015-0062718 filed on May 4, 2015, the contents of which are incorporated herein in their entirety.

BACKGROUND

The present disclosure relates to a media filter having a nonpowered mixing and coagulation basin and a seawater desalination plant using the same, and a nonpowered mixing and coagulation basin and a dissolved air floatation device using the same, and more particularly, to a nonpowered mixing and coagulation basin which generates at least two different turbulent flows inside the mixing and flocculation basin to which raw water so that particles contained in raw water circulate and come into contact with each other by a water current to coagulate into a predetermined size, and a media filter and a dissolved air floatation device having the nonpowered mixing and coagulation basin.

Reverse osmosis out of various sea water desalination methods is a method for obtaining fresh water by applying pressure to seawater to desalt seawater through a reverse osmosis (RO) membrane. The RO membrane is a semipermeable membrane having ultrafine pores with a diameter of about 0.1 nm to 0.5 nm, and has been widely used to desalinate seawater, having the property to selectively penetrate only water molecules but not to penetrate impurities, such as salt.

However, seawater which is raw water contains not only the impurities, such as salt, but also fine suspended matters having coarse particles. Therefore, in order to prevent pollution of the RO membrane by the fine suspended matters, a pre-treatment process for removing the fine suspended matters from seawater is carried out at the front end of various plants for seawater desalination water treatment including the desalination treatment by the RO membrane. Moreover, in order to remove fine suspended matters contained in seawater, a pre-treatment process having a mixing basin, a coagulation basin and a filter basin or a water treatment process having a mixing basin, a coagulation basin and a floatation basin has been generally used.

First, the media filter of the former will be described.

The mixing basin rapidly mixes chemicals and raw water, first coagulates fine suspended matters, and discharges the coagulated fine suspended matters to the coagulation basin. The coagulation basin grows the suspended matters first coagulated by the mixing basin into the size filterable in the filter basin, and then, discharges the suspended matters to the filter basin arranged at the rear end. For this, mechanical agitators are mounted inside the mixing basin and the coagulation basin in order to form a circulating water flow for inducement of coagulation and growth of aggregates through contact between an injected coagulant or an auxiliary coagulant and the suspended matters.

The filter basin filters grown flocculated matters passing a filter media or a membrane made of sand or activated carbon, and especially, sand filtering is a method to remove suspended matters by inducing raw water to the filter basin in which the filter media having a sand layer and a support gravel layer is mounted and passing and passes the filter basin. In order to increase removal efficiency of the suspended matters, dual media filtration (DMF) that has different filter media, such as sand, activated carbon and anthracite, arranged doubly has been used widely.

The dual media filtration is a method to remove suspended matters by passing and filtering suspended matters through a two-layered grain filter media made with sand and anthracite. In general, the dual media filtration has an advantage in that it is easy to secure filter media and it is possible to treat dissolved organic matters because a double-layered filter is provided.

Next, the water treatment system for floatation of the latter will be described.

The mixing basin and the coagulation basin of the water treatment system are generally identical or similar to those of the media filter, but the water treatment system is different from the media filter in that the water treatment system uses not the filter basin but the floatation basin. The floatation basin can collect and remove particles by skimming when the particles rise to the surface. That is, the floatation basin attaches microbubbles to a suspended phase contained in a dispersion medium by a physical action to raise to a limiting surface where the dispersion medium gets in contact with the air in order to induce solid-liquid separation.

Such a flotation basin adopts dissolved air floatation (DAF), induced air flotation (IAF), vacuum flotation, electrolytic flotation, microbiological auto flotation and so on according to microbubble generating methods.

Dissolved air floatation (DAF) is a water treatment method including the steps of: sufficiently dissolving air in water at high pressure; injecting the dissolved air into raw water; forming the air supersaturated in the water, which is decompressed under water, into microbubbles; combining the microbubbles with flocs in the treated raw water; and rapidly raising the bubble-floc combination to the surface of water in order to achieve solid-liquid separation.

It is essential to inject chemicals in order to remove suspended particulate matters during the water treatment process or the seawater desalination process which include all of the former and the latter. In general, because most coagulants used for water treatment form flocs and carries out coagulation as soon as raw water is put in, namely, within one second, it is very important to rapidly mix the coagulant with raw water as soon as possible after the coagulant is put in. The reason is that coagulation efficiency is deteriorated when the coagulant is not rapidly mixed as soon as raw water is put in, namely, when the coagulant is not evenly distributed to the whole raw water. Therefore, core elements for design are injection spots and injection methods when the coagulant is injected, flow forms of raw water and structures of mixing basins.

As the mixing method, there are a mechanical type, a water current type, a diffusion pump type and so on. The mechanical mixing has been used the most widely in the water treatment process. For this, one or more mechanical mixing devices are mounted on a tank or a water channel. General design standards are mixing intensity of 300 sec$^{-1}$ (G value), mixing period of 10 seconds to 30 seconds, and required power of 2.23 hp to 2.62 hp per 10,000 m$^3$/d. The mechanical flash mixing has several disadvantages in that it is difficult to mix in a moment, in that the mechanical flash mixing causes lots of short circuits, in that it takes too much time and a lot of energy to mix a metal salt coagulant, and in that a rotary shaft and a gear drive frequently get into trouble.

Moreover, because the mixing basin and the coagulation basin respectively have impeller-type mechanical agitators, the mechanical agitators must be continuously operated in order to dispose wastewater. Therefore, the mechanical flash mixing device has additional disadvantage in that it increases facility installation fees and maintenance fees, such as electric charges for operating the mechanical agitators. Furthermore, the mechanical flash mixing device has a further disadvantage in that bad smell is spread when the mechanical agitator is operated because the conventional flash mixing basin has an open structure at the upper part.

Japanese Patent Publication No. 1993-038492 published on Feb. 19, 1993 discloses a method for removing pollutants from seawater supplied to a seawater desalination system, more particularly, a method for removing pollutants by putting an inorganic compound solution and a sulfuric acid solution or a chloride solution into a coagulant and passing the solution through a double-layered filter tower which is filled with sand and anthracite.

Korean Patent No. 0916709 published on Sep. 11, 2009 discloses a nonpowered mixing apparatus within a pipe to maximize mixing efficiency using scattering elements to get in contact with raw water by chemicals which are scattered in the reverse direction to the raw water.

However, these devices still have disadvantages in that facility installation fees and maintenance fees for operating the mechanical agitators are increased because the agitators must be continuously operated to carry out pre-treatment of raw water or in that filtering efficiency is deteriorated because flocs generated by coagulation between chemicals and suspended matters of raw water are not grown enough to be removed in the filter basin when mixing is carried out without power.

Additionally, Korean Patent No. 1133174 published on Apr. 6, 2012 discloses a movable water treatment system and an automatic control method using DAF with an independent power supply for small and medium sized water bodies. Korean Patent No. 1133174 proposes a water treatment system utilizing DAF to a movable vehicle having self-power source which does not need supply of driving power from an external supply source. However, there is still a disadvantage in that a mechanical agitator must be continuously operated for water treatment and it causes equipment installation expenses and maintenance fees for operating the mechanical agitator.

SUMMARY

Accordingly, the present disclosure has been made to solve the above-mentioned problems, and it is an object to provide a media filter having a nonpowered mixing and coagulation basin, which generates turbulent flows inside raw water by layered different materials filling the mixing and coagulation basin so that particles contained in the raw water circulate therein and come into contact with each other by a water current to coagulate into a predetermined size, a media filter disposed inside a channel mounted to supply and distribute raw water to a filter basin, and a seawater desalination plant using the same.

Moreover, it is another object to provide a nonpowered mixing and coagulation basin, which generates turbulent flows inside raw water by layered different materials filling the mixing and coagulation basin so that particles contained in the raw water circulate therein and come into contact with each other by a water current to coagulate into a predetermined size, and a dissolved air floatation apparatus using the same.

To accomplish the above object, according to a first preferred embodiment, there is provided a media filter having a nonpowered mixing and coagulation basin including: a mixing and coagulation basin for coagulating particles to form flocs and growing up them when a coagulant is put in raw water; and a plurality of filter basins for filtering and removing the flocs contained in the raw water using media filling the inside of the filter basin, wherein the mixing and coagulation basin includes: a first mixing and coagulation part which is filled with first turbulence derivatives to generate high speed turbulence to form flocs in the raw water; and a second mixing and coagulation part which is filled with second turbulence derivatives to generate turbulence slower than the turbulence of the first mixing and coagulation part so as to grow the flocs in the raw water passing the first mixing and coagulation part, and wherein the mixing and coagulation basin is disposed inside a supply channel through which the raw water is transferred to a filter basin.

The supply channel includes: an inflow channel through which the raw water to be treated is flown in from the outside; and a distribution channel which supplies the raw water to a plurality of the filter basins.

The inflow channel includes: a first partition which is mounted at right angles to the bottom at a position spaced apart from the bottom of the inflow channel at a predetermined interval to partition an inner space of the inflow channel, the inner spaces of the inflow channel partitioned by the first partition are respectively filled with the first turbulence derivatives, and the raw water passes the first turbulence derivatives in a first direction from an inflow pipe of the first mixing and coagulation part and then passes the first turbulence derivatives in a second direction opposite to the first direction to be transferred to the distribution channel.

The second mixing and coagulation part is disposed inside the distribution channel, and the second turbulence derivatives fill the inner spaces of the distribution channel side by side in the downstream direction.

The distribution channel includes: a main flow path having the second mixing and coagulation part, and a bypass flow path disposed in parallel with the main flow path; a second partition for partitioning the main flow path from the bypass flow path; and at least one sluice disposed on the second partition in order to transfer the treated water flown into the main flow path to the bypass flow path.

The first turbulence derivatives are mesh-type materials which are stacked manifold, or a plurality of fiber aggregates which get tangled together.

The second turbulence derivatives are a plurality of pall ring type materials. The second mixing and coagulation part has separate stages which are filled with a plurality of the pall ring type materials and are arranged side by side in series. The stages are disposed to get smaller in packing density of the pall ring type materials toward the downstream side.

The filter basin is a dual media filtration (DMF) basin.

In another aspect, the present disclosure provides a seawater desalination plant for producing fresh water by carrying out desalination treatment after carrying out a pretreatment process to remove pollutants inside seawater through the media filter.

In a further aspect, the present disclosure provides a nonpowered mixing and coagulation basin which coagulates coagulant injected into raw water and particles inside the raw water to form and grow up flocs, including: a first mixing and coagulation part which is filled with first turbulence derivatives to generate high speed turbulence to first form flocs in the raw water; and a second mixing and coagulation part which is filled with second turbulence derivatives to generate turbulence slower than the turbulence of the first mixing and coagulation part so as to second grow the flocs in the raw water passing the first mixing and coagulation part.

The nonpowered mixing and coagulation basin further includes a porous separation membrane for partitioning the first mixing and coagulation part from the second mixing and coagulation part in order to maintain different turbulence intensities between the first mixing and coagulation part and the second mixing and coagulation part.

The first mixing and coagulation part is disposed above the second mixing and coagulation part so that the raw water passing the first mixing and coagulation part is supplied to the second mixing and coagulation part by gravity.

The first turbulence derivatives are mesh-type materials which are stacked manifold or a plurality of fiber aggregates which get tangled together.

The second turbulence derivatives are a plurality of pall ring type materials, and the second mixing and coagulation part has a plurality of stages which are filled with a plurality of the pall ring type materials and are spaced apart from each other. The stages are disposed to get smaller in packing density of the pall ring type materials toward the downstream side.

In a still further aspect, the present disclosure provides a dissolved air floatation (DAF) apparatus which includes a mixing and coagulation basin for coagulating flocs when coagulant is put in raw water and a floatation basin for floating and removing flocs when microbubbles are injected to the raw water, the DAF apparatus further including: a first mixing and coagulation part which is filled with first turbulence derivatives to generate high speed turbulence to form flocs in the raw water; and a second mixing and coagulation part which is filled with second turbulence derivatives to generate turbulence slower than the turbulence of the first mixing and coagulation part so as to grow the flocs in the raw water passing the first mixing and coagulation part.

The DAF apparatus further includes an additional coagulation basin having an agitator mounted between the mixing and coagulation basin and the floatation basin, and a bypass channel disposed below the first mixing and coagulation part to transfer treated water passing the first mixing and coagulation part to the rear end without passing through the second mixing and coagulation part.

The first mixing and coagulation part is disposed above the second mixing and coagulation part so that the raw water passing the first mixing and coagulation part is supplied to the second mixing and coagulation part by gravity.

The first turbulence derivatives are mesh-type materials which are stacked manifold or a plurality of fiber aggregates which get tangled together, and the second turbulence derivatives are a plurality of pall ring type materials. The stages are disposed to get smaller in packing density of the pall ring type materials toward the downstream side.

The present disclosure relates to a media filter having a nonpowered mixing and coagulation basin, a seawater desalination plant using the same, and a dissolved air floatation apparatus using the nonpowered mixing and coagulation basin. The media filter generates turbulent flows by injecting mash-type materials to an upstream zone of raw water flowing into the media filter or to the upper part of the mixing and coagulation basin of the dissolved air floatation apparatus in order to rapidly mix particles contained in the raw water with a coagulant and carries out slow coagulation by filling a downstream zone of the raw water with packing materials (Pall Ring) to form two different turbulent strengths at the upstream zone and the downstream zone, thereby reducing power consumption without using any power unit.

Furthermore, the media filter according to the present disclosure can miniaturize the entire equipment, reduce engineering costs and maximize efficiency of the supply/distribution channel which was not good in space occupation conventionally, because the mixing/filter basin which was conventionally mounted at the front end of the filter basin is disposed integrally on the channel which supplies and distributes raw water to the filter basin.

Therefore, the media filter having the nonpowered mixing and coagulation basin can realize a compact size because it can simultaneously carry out mixing and coagulation inside the supply channel through which the raw water is transferred, reduce equipment expenses because it does not need an electric motor and an agitator, and reduce capital expenditures (CAPEX) and operating expenditures (OPEX) by reducing power consumption because it does not use any power unit.

Additionally, the nonpowered mixing and coagulation basin is formed to have multiple stages with different packing materials and packing densities to form turbulent flows inside the raw water and control a flow speed, thereby uniformly mixing raw water and coagulant to enhance coagulation efficiency.

Therefore, the nonpowered mixing and coagulation basin can miniaturize the entire water treatment system because the nonpowered mixing and coagulation basin can simultaneously carry out mixing and coagulation at the front end part of the water treatment system, reduce equipment expenses because it does not need an electric motor and an agitator, and reduce capital expenditures (CAPEX) and operating expenditures (OPEX) by reducing power consumption because it does not use any power unit.

BRIEF DESCRIPTION OF THE DRAWINGS

The above and/or other aspects of the disclosure will become apparent and more readily appreciated from the following description of the embodiments, taken in conjunction with the accompanying drawings of which.

DETAILED DESCRIPTION

Figure 1:
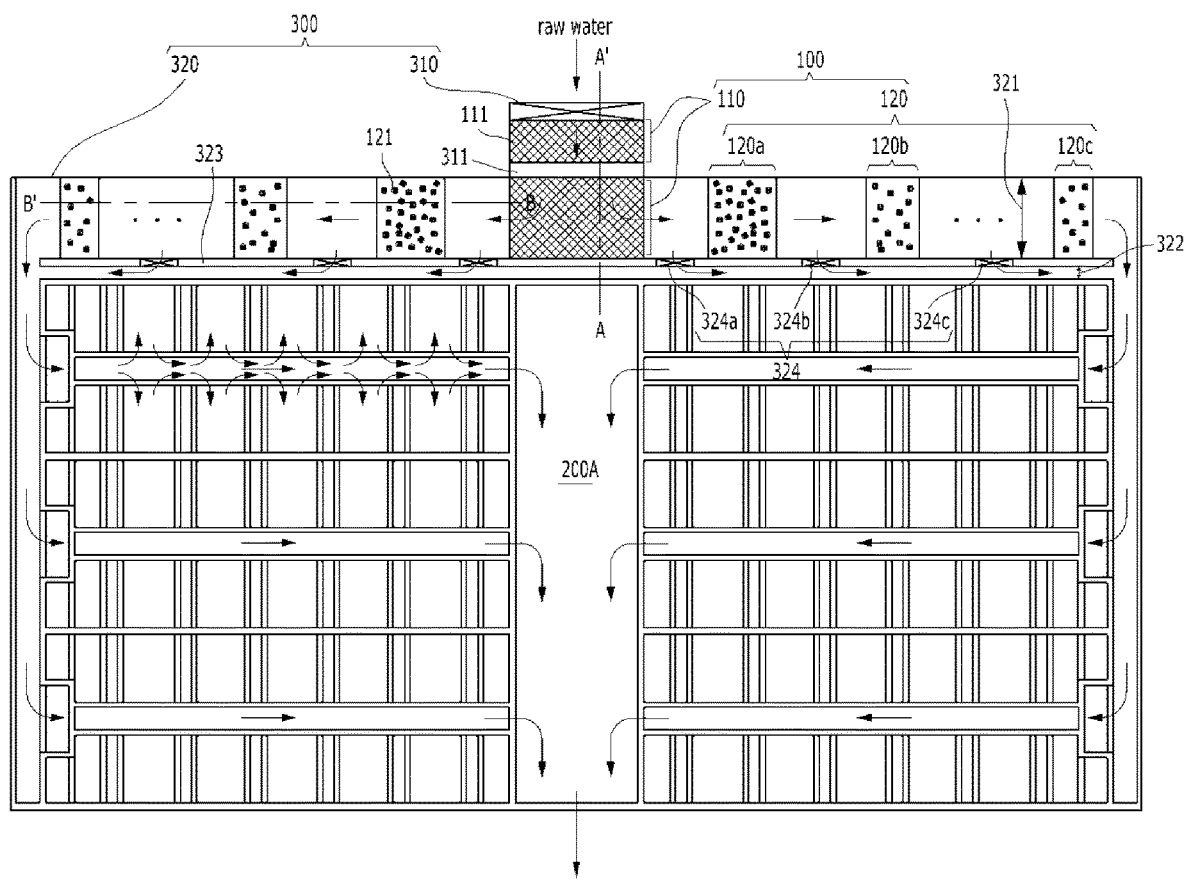
FIG. 1 is a mimetic plan view showing a media filter having a nonpowered mixing and coagulation basin according to an exemplary embodiment.

Reference will be now made in detail to embodiments of the present disclosure with reference to the attached drawings. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the disclosure.

Not otherwise particularly defined, it will be understood that the term, 'raw water', means water, such as wastewater and seawater containing various pollutants, requiring water treatment. Therefore, 'particles' contained in the raw water means various impurities, such as various pollutants containing alga and high concentration organic matters. Moreover, 'treated water' means raw water goes through each stage or step, and 'coagulation' means the phenomenon that particles contained in the raw water form a big floc by being tangled by contact with a coagulant. Hereinafter, it should be generally understood that the phenomenon that the particles are coagulated into a big floc has a wide meaning including the meaning of flocculation.

Hereinafter, referring to the drawings, the media filter having the nonpowered mixing and coagulation basin and the seawater desalination plant using the same according to the present disclosure will be described in detail.

FIG. 1 is a mimetic diagram showing the media filter having the nonpowered mixing and coagulation basin according to an exemplary embodiment. In more detail, the media filter having the mixing and coagulation basin according to the present disclosure includes: a mixing and coagulation basin 100 for coagulating particles to form flocs and growing them when a coagulant is put in raw water; and a plurality of filter basins 200 for filtering and removing the flocs contained in the raw water using media filling the inside of the filter basin, wherein the mixing and coagulation basin 100 includes: a first mixing and coagulation part 110 which is filled with first turbulence derivatives 111 to generate high speed turbulence to form flocs in the raw water; and a second mixing and coagulation part 120 which is filled with second turbulence derivatives 121 to generate turbulence slower than the turbulence of the first mixing and coagulation part 110 so as to grow the flocs in the raw water passing the first mixing and coagulation part 110 so that particles contained in the raw water are coagulated into a predetermined size while circulating and getting in contact with a coagulant in the mixing and coagulation basin 100 by the turbulences without agitation power, and wherein the mixing and coagulation basin 100 is disposed inside a supply channel 300 through which the raw water is transferred to a filter basin 200A.

The media filter having the mixing and coagulation basin according to the present disclosure can be supplied with raw water from the outside through the supply channel 300. The supply channel 300 includes: an inflow channel 310 through which the raw water to be treated flows in from the outside; and a distribution channel 320 which supplies the raw water to a plurality of the filter basins 200.

The first mixing and coagulation part 110 is disposed inside the inflow channel 310, and the second mixing and coagulation part 120 is disposed inside the distribution channel 320. In order to maintain different turbulent strengths between the first mixing and coagulation part 110 and the second mixing and coagulation part 120, it is preferable that a partition be disposed to divide the inflow channel 310 and the distribution channel 320 so that the raw water passing the inflow channel 310 is supplied to the distribution channel 320 by a waterfall through the partition.

Figure 2:
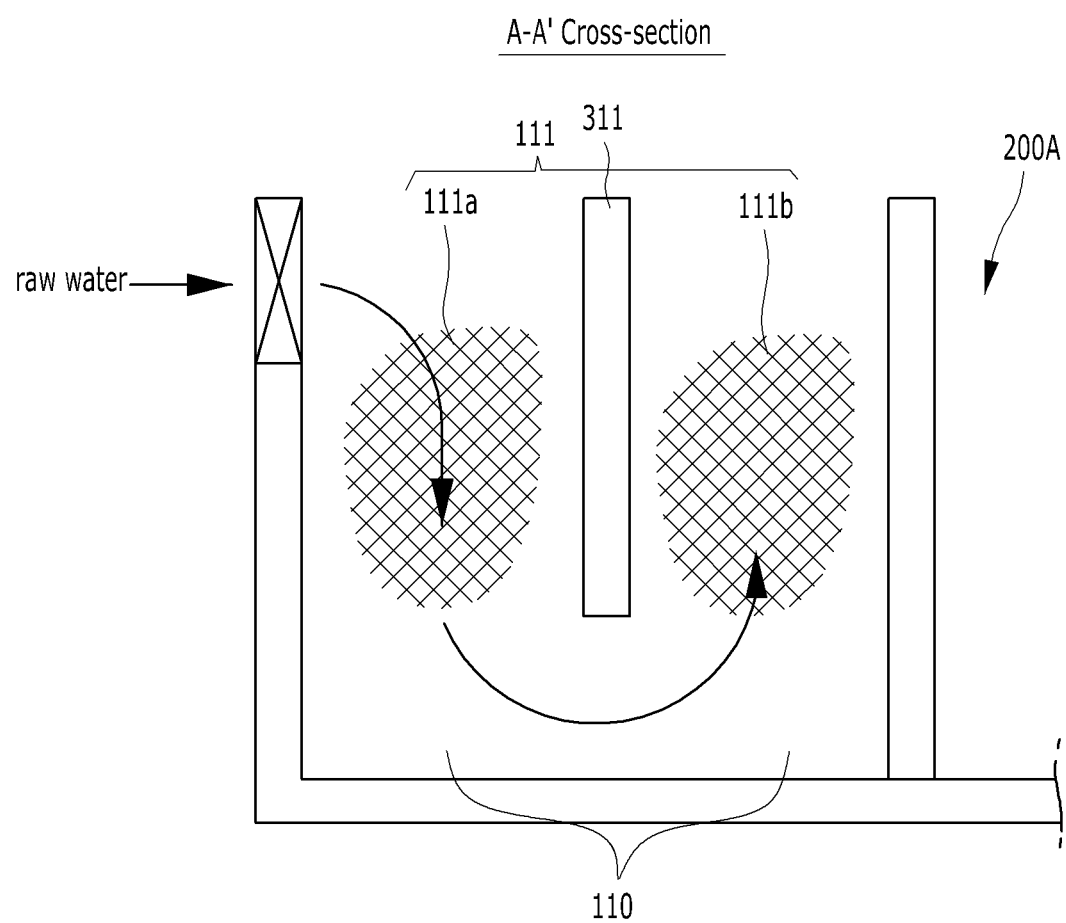
FIG. 2 is a sectional view taken along the line A-A' showing the media filter having the nonpowered mixing and coagulation basin.
Figure 3:
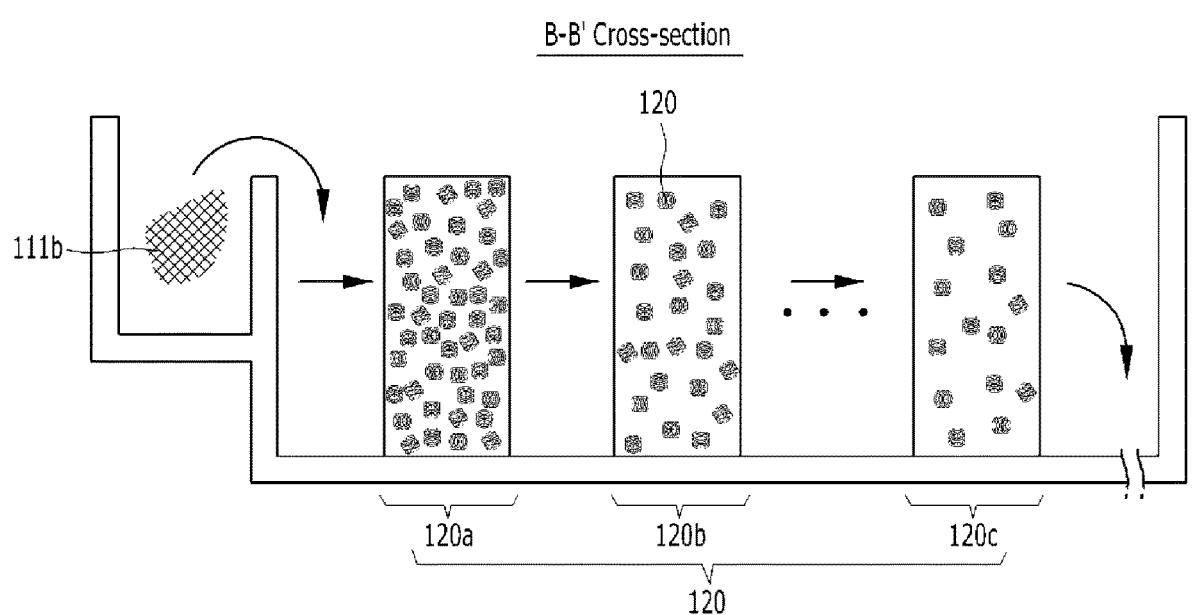
FIG. 3 is a sectional view taken along the line B-B' showing the media filter having the nonpowered mixing and coagulation basin.

Referring to FIGS. 2 and 3, the inflow channel 310 includes: a first partition 311 which is mounted at right angles to the bottom at a position spaced apart from the bottom of the inflow channel 310 at a predetermined interval to partition an inner space of the inflow channel 310, and the inner spaces of the inflow channel 310 partitioned by the first partition 311 are respectively filled with the first turbulence derivatives 111a and 111b. So, the raw water passes the first turbulence derivative 111a in the downstream direction as a first direction, and then, passes the first turbulence derivative 111b in a second direction opposite to the first direction to be transferred to the distribution channel 320.

The first mixing and coagulation part 110 is a watertight space where the particles contained in the raw water can form flocs by contact with the coagulant while being circulated by the turbulences, and includes the first turbulence derivatives 111 disposed in the downstream direction and/or in the upstream direction and an inflow pipe disposed at an upper part of the first mixing and coagulation part 110.

The raw water flown in through the inflow pipe in the form of a straight water flow forms a rapid turbulent flow while passing the first turbulent derivatives 111 filling the inside of the first mixing and coagulation part 110, so that the particles contained in the raw water come into contact with the coagulant to form flocs by the turbulences. The first turbulent derivatives 111 may have the form that mesh-type materials are stacked manifold or the form that a plurality of fiber aggregates get tangled together, preferably, may be stacked asymmetrically not to vertically coincide pores with each other between the mesh-type material having pores and the neighboring mesh-type material. Because the pores of the mesh-type materials are stacked asymmetrically in the vertical direction, the filter media according to the present disclosure can generate turbulences by gravity while the raw water passes the mesh-type materials and control the speed of turbulences generated according to sizes of the pores.

When the treated water passing the first mixing and coagulation part 110 is transferred to the distribution channel 320 by waterfall, the treated water passes the second mixing and coagulation part 120 disposed inside the distribution channel or passes a bypass flow path 322 in parallel with the downstream direction of the second mixing and coagulation part 120, and then, is transferred to the filter basins 200.

The distribution channel 320 includes: a main flow path 321 having the second mixing and coagulation part 120; the bypass flow path 322 disposed in parallel with the main flow path 321; a second partition 323 for partitioning the main flow path 321 from the bypass flow path 322; and at least one sluice 324 (342a, 324b, 324c) disposed on the second partition 323 in order to transfer the treated water flown into the main flow path 321 to the bypass flow path 322. The sluice 324 of the second partition 323 for partitioning the second mixing and coagulation part 120 from the bypass flow path 322 can control a flow of the raw water to pass a stage of the second mixing and coagulation part 120 which is filled with a plurality of pall ring type materials according to conditions of the raw water.

The second mixing and coagulation part 120 is a space for growing the flocs contained in the treated water by the slow turbulence generated while the treated water passing the first mixing and coagulation part 110 passes the second turbulence derivatives 121. The downstream area of the second mixing and coagulation part 120 can communicate with the filter basin 200A for filtering the treated water containing the flocs.

The rapid turbulence of the first mixing and coagulation part 110 and the slow turbulence of the second mixing and coagulation part 120 are not specifically limited in speed, and can be defined by a relative difference in turbulent strength inside the first mixing and coagulation part 110 and the second mixing and coagulation part 120. The second turbulence derivatives 121 are filled with a plurality of the pall ring type materials, and preferably, a plurality of separate stages which are filled with a plurality of the pall ring type materials are arranged side by side in multiple stages.

In the second mixing and coagulation part 120 in which the separate stages filled with a plurality of the pall ring type materials are arranged side by side in multiple stages, the number of the stages can be controlled according to conditions of the raw water, and it is preferable that the stages be separated from each other and packing density get gradually smaller toward the downstream area. The reason is that turbulence diminishes in speed and flocs can grow more when packing density becomes lower.

Preferably, the filter basin 200A is a dual media filtration basin which is filled with media with different specific gravities in two stages in order to provide effective filtration. Because the dual media filtration method and the media used for the dual media filtration are not specifically limited if they are used to filter suspended matters and foreign matters which are generally contained in raw water, their detailed descriptions will be omitted.

The media filter having the nonpowered mixing and coagulation basin can control the number of the stages of the second mixing and coagulation part 120 and control the flow of the raw water through the bypass flow path 322 according to the conditions of the raw water.

In more detail, if the flocs coagulated in the treated water passing the first mixing and coagulation part 110 are grown up into a sufficient size for the filter basin 200A, the flocs can be controlled in flow to select a first flow to direct the flocs toward the filter basin 200A not through the multiple stages of the second mixing and coagulation part 120 but through the bypass flow path 322, a second flow to direct the flocs toward the filter basin 200A in such a way that the flocs pass some of the multiple stages of the second mixing and coagulation part 120 from the first mixing and coagulation part 110 and are transferred to the bypass flow path 322 through the sluice 324 included in the second partition 323, and a third flow to direct the flocs toward the filter basin 200A after passing the first mixing and coagulation part 110 and the second mixing and coagulation part 120.

Therefore, the media filter according to the present disclosure can selectively control the flow of the treated water from the first flow to the third flow according to conditions, temporary problems and states of the raw water, thereby reducing operation expenses.

In another aspect of the present disclosure, a seawater desalination plant carries out desalination using reverse osmosis after carrying out pre-treatment to seawater through the media filter having the nonpowered mixing and coagulation basin. Preferably, the seawater desalination plant obtains fresh water through the steps of: making raw water, namely, seawater, get in contact with a coagulant through the media filter having the nonpowered mixing and coagulation basin to form and grow up flocs; carrying out pre-treatment by filtering the flocs through the filter basin 200A to remove organic contaminants or inorganic solid bodies in the seawater; and desalting seawater by passing the pre-treated seawater through a desalinator.

The desalinator includes a reverse osmosis membrane with a hole diameter of about 1 nm to 2 nm. It is preferable that the reverse osmosis membrane be in a spiral form, a tubular form or a hollow fiber membrane form to treat a great deal of seawater.

The seawater desalination plant using the media filter having the nonpowered mixing and coagulation basin can recover efficiency through backwash when the media filter or the desalinator which are the pre-treatment devices are deteriorated in efficiency by long-term operation, and can desalinate seawater through repeated recycling.

In the meantime, the present disclosure provides a nonpowered mixing and coagulation basin and a dissolved air floatation apparatus using the same according to a further preferred embodiment.

Figure 4:
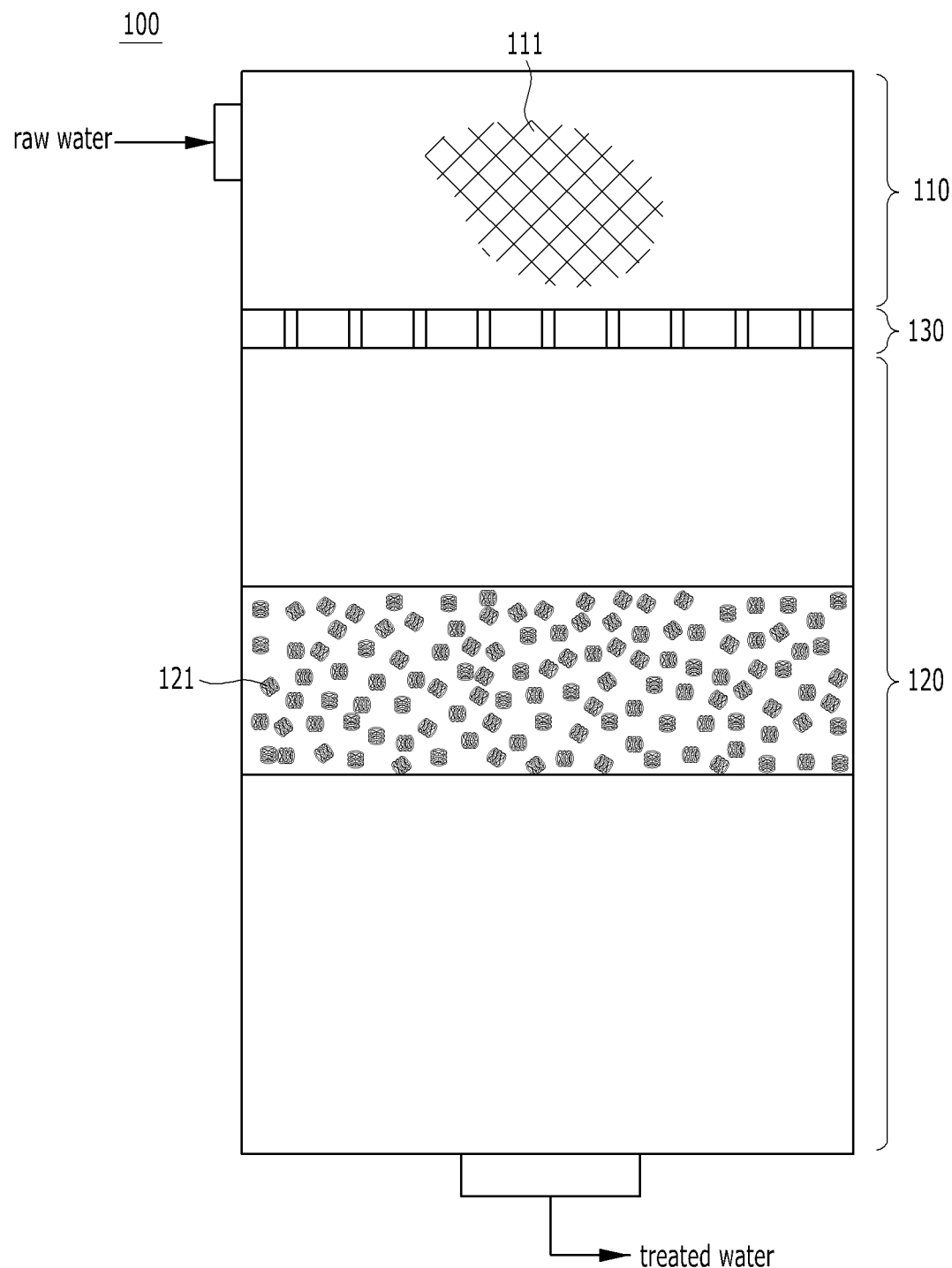
FIG. 4 is a mimetic diagram showing a nonpowered mixing and coagulation basin according to an exemplary embodiment.

FIG. 4 is a mimetic diagram showing a nonpowered mixing and coagulation basin 100 according to an exemplary embodiment of the present disclosure. In more detail, the nonpowered mixing and coagulation basin which coagulates coagulant injected into raw water and particles inside the raw water to form and grow up flocs, in order to substitute for functions of the conventional mechanical mixing and coagulation basin, includes: a first mixing and coagulation part 110 which is filled with first turbulence derivatives 111 to generate high speed turbulence to first form flocs in the raw water; and a second mixing and coagulation part 120 which is filled with second turbulence derivatives 121 to generate turbulence slower than the turbulence of the first mixing and coagulation part 110 so as to second grow the flocs in the raw water passing the first mixing and coagulation part 110, so that the particles contained in the raw water are coagulated into a predetermined size by coming into contact with the coagulant while circulating inside the mixing and coagulation basin by turbulent flows without any stirring power.

The nonpowered mixing and coagulation basin 100 further includes a porous separation membrane 130 for partitioning the first mixing and coagulation part 110 and the second mixing and coagulation part 120 in order to maintain different turbulence intensities between the first mixing and coagulation part 110 and the second mixing and coagulation part 120.

First, the first mixing and coagulation part 110 is a watertight space to form flocs while the particles contained in the raw water are circulated by turbulent flows generated when the raw water flowing into the first mixing and coagulation part 110 passes the first turbulent derivatives 111, and has an inflow pipe disposed at the upper side to make the raw water flow in.

The raw water flowing through the inflow pipe in the form of a straight flow forms a high-speed turbulence while passing the first turbulent derivatives 111 charged in the first mixing and coagulation part 110, and the particles contained in the raw water and the coagulant come into contact with each other by the turbulence so as to form flocs. The first turbulent derivatives 111 are mesh-type materials which are stacked manifold or a plurality of fiber aggregates which get tangled together, and preferably, may be stacked asymmetrically not to vertically coincide pores with each other between the mesh-type material having pores and the neighboring mesh-type material. Because the pores of the mesh-type materials are stacked asymmetrically in the vertical direction, the filter media according to the present disclosure can generate turbulences by gravity while the raw water passes the mesh-type materials and control the speed of turbulences generated according to sizes of the pores.

The second mixing and coagulation part 120 is a space for growing the flocs contained in the raw water due to a slow-speed turbulence generated when the treated water passing the first mixing and coagulation part 110 passes the second turbulent derivatives 121, and includes a treated water discharge pipe mounted at the lower side for discharging the treated water in which the flocs are contained.

The second turbulent derivatives 121 has the form that is filled with a plurality of pall ring type materials, preferably, may be formed by a plurality of separate stages filled with the plural pall ring type materials which are stacked in multilayers.

Figure 5:
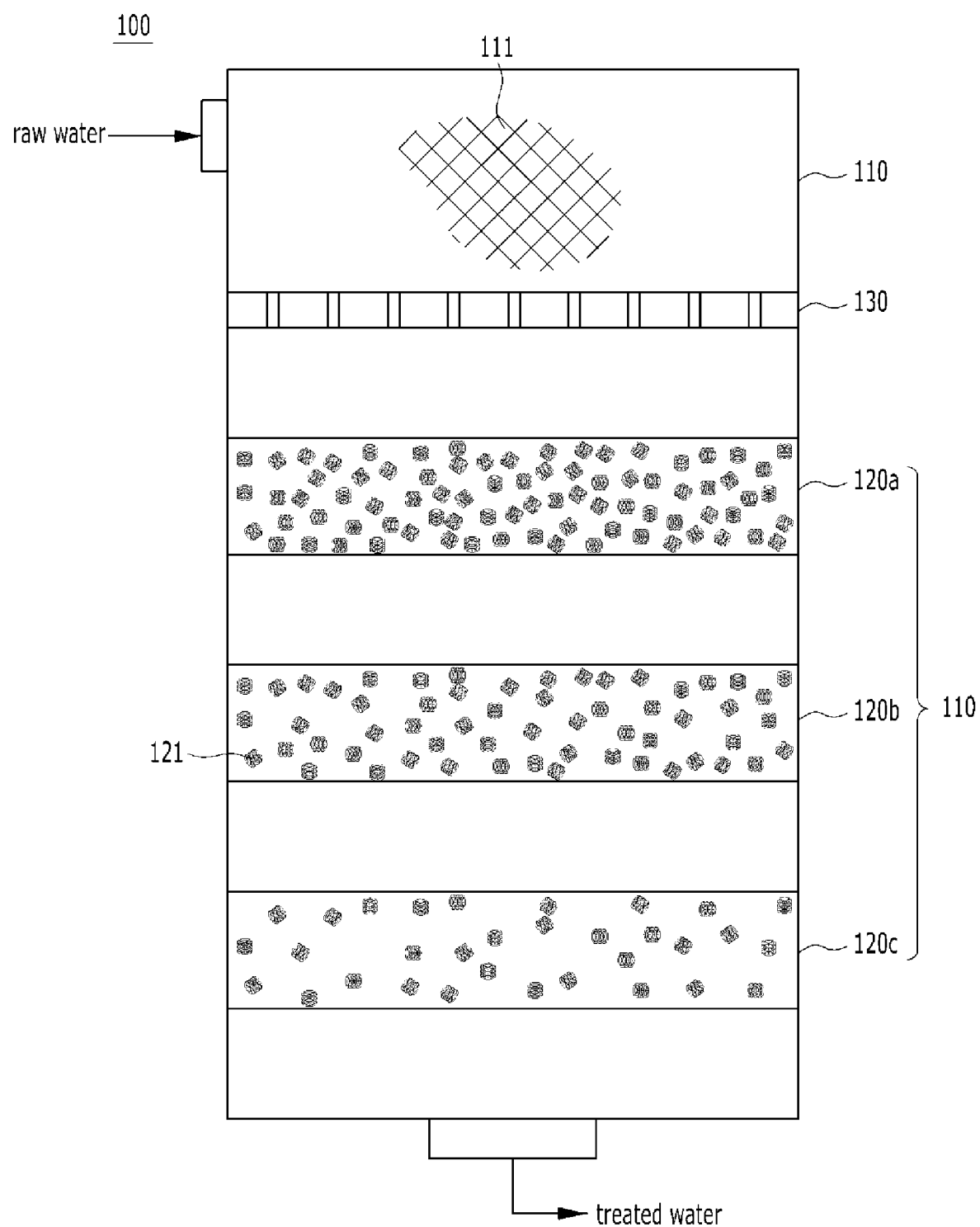
FIG. 5 is a mimetic diagram showing a nonpowered mixing and coagulation basin according to another exemplary embodiment.

FIG. 5 is a schematically mimetic diagram showing a nonpowered mixing and coagulation basin 100 having the second mixing and coagulation basin 120 which has the form that the stages filled with the plural pall ring type materials are stacked in multilayers. In the second mixing and coagulation part 120 of the nonpowered mixing and coagulation basin 100 according to the present disclosure, the number of the stages of the separated type which are respectively filled with the pall ring type materials can be regulated according to conditions of the raw water. It is preferable that the stages be disposed to get smaller in packing density of the pall ring type materials toward the downstream side. The reason is that it can grow up the flocs bigger because turbulence speed gets slower when packing density gets lower.

The separation membrane 130 is to partition the first mixing and coagulation part 110 from the second mixing and coagulation part 120 in order to maintain different turbulence speeds between the first mixing and coagulation part 110 and the second mixing and coagulation part 120. The first mixing and coagulation part 110 generates rapid-speed turbulence and the second mixing and coagulation part 120 generates slow-speed turbulence to form and grow up the flocs by coagulating the particles contained in the raw water. There is no special limit in speed of the rapid-speed turbulence or slow-speed turbulence and the difference in speed of turbulences is caused by a relative difference in turbulence intensity inside the mixing and coagulation basin.

Therefore, in the nonpowered mixing and coagulation basin according to the present disclosure, the first mixing and coagulation part 110 is disposed above the second mixing and coagulation part 120, so that the raw water put in the first mixing and coagulation part generates rapid-speed turbulence while passing the first turbulent derivatives 111 to first form flocs. After that, the raw water goes through the pores of the separation membrane 130 by gravity, and grows up the flocs formed in the first mixing and coagulation part due to slow-speed turbulence formed while passing the stages 120a, 120b and 120c filled with the second turbulent derivatives 121 of the second mixing and coagulation part.

Figure 6:
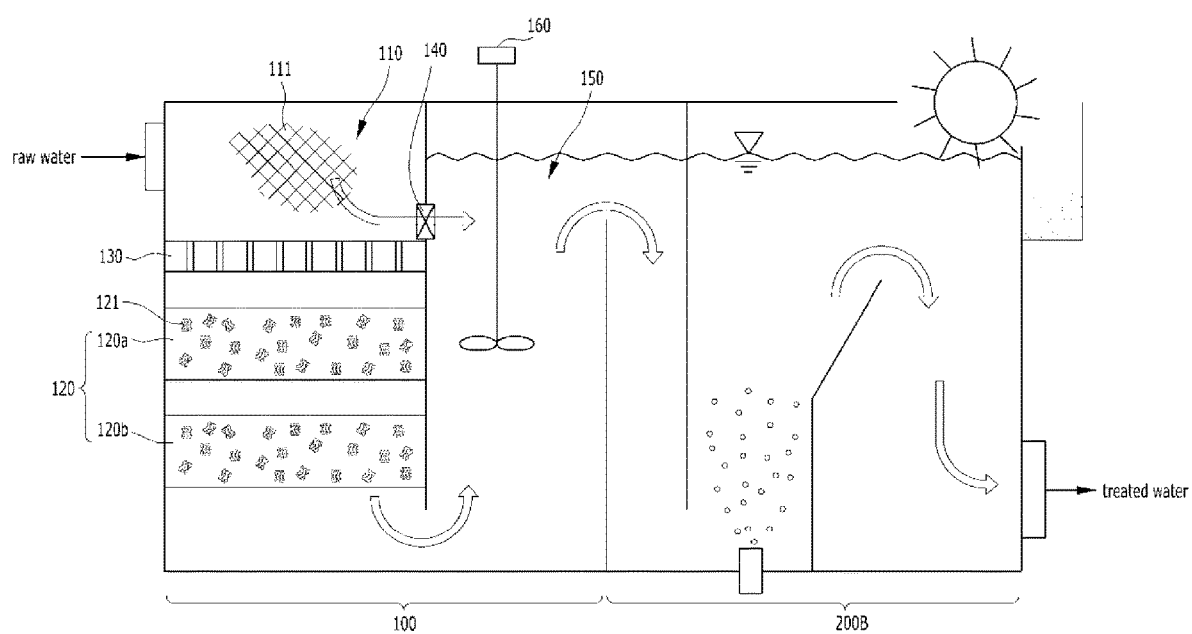
FIG. 6 is a mimetic diagram showing a dissolved air floatation apparatus having a nonpowered mixing and coagulation basin according to a further exemplary embodiment.

FIG. 6 is a mimetic diagram showing a dissolved air floatation apparatus having a nonpowered mixing and coagulation basin according to a further exemplary embodiment of the present disclosure. The dissolved air flotation (DAF) apparatus includes a mixing and coagulation basin for coagulating foreign matters when coagulant is put in raw water and a floatation basin 200B for floating and removing flocs when microbubbles are injected to the raw water. The nonpowered mixing and coagulation basin includes: a first mixing and coagulation part 110 which is filled with first turbulence derivatives 111 to generate high speed turbulence to form flocs in the raw water; and a second mixing and coagulation part 120 which is filled with second turbulence derivatives 121 to generate turbulence slower than the turbulence of the first mixing and coagulation part 110 so as to grow the flocs in the raw water passing the first mixing and coagulation part 110. The nonpowered mixing and coagulation basin 100 is disposed at the front end of the floatation basin 200B.

Moreover, in order to sufficiently grow the flocs in the raw water passing through the mixing and coagulation basin according to conditions of the raw water, the dissolved air floatation apparatus may further include: an additional coagulation basin 150 which has an agitator 160 mounted between the mixing and coagulation basin 100 and the floatation basin 200B; and a bypass channel 140 to directly transfer the flocs from the first mixing and coagulation part 110 to the additional coagulation basin 150.

The first mixing and coagulation part 110 is disposed above the second mixing and coagulation part 120, so that the raw water put in the first mixing and coagulation part 110 passes the second mixing and coagulation part 120 by gravity.

The dissolved air floatation apparatus having the nonpowered mixing and coagulation basin according to the present disclosure can control the number of the stages 120a, 120b and 120c of the second mixing and coagulation part 120 or control the flow through the bypass channel 140 and the agitator 160 according to the conditions of the raw water requiring water treatment. In more detail, in a case that the additional coagulation basin 150 is needed in order to increase coagulation efficiency of the flocs, the agitator 160 included in the additional coagulation basin is operated, and then, a first flow to direct the floatation basin 200B through the second mixing and coagulation part 120 and the additional coagulation basin 150 from the first mixing and coagulation part 110 and a second flow to direct the floatation basin 200B through the bypass channel 140 and the additional coagulation basin 150 from the first mixing and coagulation part 110 are selectively controlled. In a case that the additional coagulation basin 150 is not needed, the agitator 160 is stopped, and then, a third flow to direct the floatation basin 200B through the second mixing and coagulation part 120 from the first mixing and coagulation part 110 and a fourth flow to direct the floatation basin 200B through the bypass channel 140 from the first mixing and coagulation part 110 are selectively controlled.

Therefore, the flow of the treated water can be selectively controlled into the first flow to the fourth flow according to conditions of the raw water, temporary problems and situations, so that operating costs can be reduced.

Hereinafter, the embodiment of the present disclosure will be described. However, it is not to be restricted by the embodiment but only by the appended claims. It is to be appreciated that those skilled in the art can change or modify the embodiment in various ways without departing from the scope and spirit of the present disclosure.

[Embodiment 1]

In order to confirm usefulness of the nonpowered mixing and coagulation basin according to the present disclosure, the treated waters discharged before and after the nonpowered mixing and coagulation basin is installed at the front end of the floatation basin of the dissolved air floatation apparatus were measured in turbidity and total suspended solids (TSS).

The dissolved air floatation apparatus was operated under the conditions that loading rate was 30 m/n, recycle ratio was 10% and pressure was 5 bar.

TABLE 1

| | | Before installation | After installation |
|---|---|---|---|
| Turbidity (NTU) | Raw water | 10.3 | 10.3 |
| | Treated water | 4.06 | 3 |
| TSS (Total Suspended Solids) (mg/L) | Raw water | 18.8 | 18.8 |
| | Treated water | 4 | 2.8 |

As seen from table 1, turbidity of the treated water after installation of the nonpowered mixing and coagulation basin was reduced by 1.06 NTU and TSS was reduced by 1.2 mg/L compared with that before installation.

Therefore, when the nonpowered mixing and coagulation basin was installed at the front end of the floatation basin of the dissolved air floatation apparatus, the particles contained in the raw water were coagulated and removed more effectively.

Further, the embodiments discussed have been presented by way of example only and not limitation. Thus, the breadth and scope of the disclosure should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A media filter including a mixing and coagulation basin configured to coagulate particles to form flocs and to grow the flocs when a coagulant is put in raw water, and a plurality of filter basins configured to filter and remove the flocs contained in the raw water using media filling the inside of the filter basin,
wherein the mixing and coagulation basin comprises:
a first mixing and coagulation part which is a compartment for holding the raw water and includes a watertight space that occupies a bottom portion of the compartment and is filled with first turbulence derivatives to generate turbulence to form flocs in the raw water; and
a second mixing and coagulation part which is filled with second turbulence derivatives to generate turbulence slower than the turbulence of the first mixing and coagulation part so as to additionally grow the flocs in the raw water passing from the first mixing and coagulation part,
wherein the mixing and coagulation basin is disposed inside a supply channel through which the raw water is transferred to the plurality of filter basins, and
wherein the supply channel comprises a distribution channel which supplies the raw water to the plurality of the filter basins and inside which the second mixing and coagulation part is disposed.

2. The media filter according to claim 1, wherein the supply channel further comprises:
an inflow channel through which the raw water to be treated flows in from the outside,
wherein the inflow channel comprises a first partition which is mounted at right angles to a bottom of the inflow channel and at a position spaced apart from the bottom of the inflow channel at a predetermined interval to partition an inner space of the inflow channel into a plurality of inner spaces, the inner spaces of the inflow channel partitioned by the first partition being respectively filled with the first turbulence derivatives, and
wherein the raw water passes the first turbulence derivatives in a first direction from an inflow pipe of the first mixing and coagulation part and then passes the first turbulence derivatives in a second direction opposite to the first direction to be transferred to the distribution channel.

3. The media filter according to claim 1, wherein the second turbulence derivatives fill the inner spaces of the distribution channel side by side in the downstream direction.

4. The media filter according to claim 3, wherein the distribution channel comprises:
a main flow path having the second mixing and coagulation part, and a bypass flow path disposed in parallel with the main flow path;
a second partition for partitioning the main flow path from the bypass flow path; and
at least one sluice disposed on the second partition in order to transfer the treated water flown into the main flow path to the bypass flow path.

5. The media filter according to claim 1, wherein a plurality of stages which are filled with the second turbulent derivatives are spaced apart from each other and arranged side by side in series.

6. The media filter according to claim 5, wherein the second turbulence derivatives are a plurality of pall ring type materials, and wherein the stages are disposed to get smaller in packing density of the pall ring type materials toward the downstream side.

7. The media filter according to claim 1, wherein the filtration basin is a dual media filtration (DMF).

8. A nonpowered mixing and coagulation basin which coagulates coagulant injected into raw water and particles inside the raw water to form and grow flocs, the nonpowered mixing and coagulation basin having a downstream area communicating with a plurality of filter basins configured to filter and remove flocs contained in the raw water and comprising:
a first mixing and coagulation part which is a compartment for holding the raw water and includes a watertight space that occupies a bottom portion of the compartment and is filled with first turbulence derivatives to generate turbulence to form the flocs in the raw water; and a second mixing and coagulation part which is filled with second turbulence derivatives to generate turbulence slower than the turbulence of the first mixing and coagulation part so as to additionally grow the flocs in the raw water passing from the first mixing and coagulation part, wherein the mixing and coagulation basin is disposed inside a supply channel through which the raw water is transferred from the nonpowered mixing and coagulation basin to the plurality of filter basins, and wherein the supply channel comprises a distribution channel which supplies the raw water to the plurality of the filter basins and inside which the second mixing and coagulation part is disposed.

9. The nonpowered mixing and coagulation basin according to claim 8, further comprising:

a porous separation membrane that partitions the first mixing and coagulation part from the second mixing and coagulation part in order to maintain different turbulence intensities between the first mixing and coagulation part and the second mixing and coagulation part.

10. The nonpowered mixing and coagulation basin according to claim 8, wherein the first mixing and coagulation part is disposed above the second mixing and coagulation part so that the raw water passing the first mixing and coagulation part is supplied to the second mixing and coagulation part by gravity.

11. The nonpowered mixing and coagulation basin according to claim 8, wherein the first turbulence derivatives are mesh-type materials which are stacked manifold or a plurality of fiber aggregates which get tangled together.

12. The nonpowered mixing and coagulation basin according to claim 8, wherein the second turbulence derivatives are a plurality of pall ring type materials.

13. The nonpowered mixing and coagulation basin according to claim 12, wherein the second mixing and coagulation part has a plurality of stages which are filled with a plurality of the pall ring type materials and are spaced apart from each other.

14. The nonpowered mixing and coagulation basin according to claim 13, wherein the stages are disposed to decrease in packing density of the pall ring type materials toward the downstream side.

15. The nonpowered mixing and coagulation basin according to claim 8, wherein the supply channel further comprises an inflow channel through which the raw water to be treated flows in from the outside, wherein the inflow channel comprises a first partition which is mounted at right angles to a bottom of the inflow channel and at a position spaced apart from the bottom of the inflow channel at a predetermined interval to partition an inner space of the inflow channel into a plurality of inner spaces, the inner spaces of the inflow channel partitioned by the first partition being respectively filled with the first turbulence derivatives, and wherein the raw water passes the first turbulence derivatives in a first direction from an inflow pipe of the first mixing and coagulation part and then passes the first turbulence derivatives in a second direction opposite to the first direction to be transferred to the distribution channel.

* * * * *